(12) United States Patent
Brusotti et al.

(10) Patent No.: US 8,356,349 B2
(45) Date of Patent: Jan. 15, 2013

(54) METHOD AND SYSTEM FOR INTRUSION PREVENTION AND DEFLECTION

(75) Inventors: Stefano Brusotti, Turin (IT); Francesco Coda Zabetta, Turin (IT)

(73) Assignee: Telecom Italia S.p.A., Milan (IT)

( * ) Notice: Subject to any disclaimer, the term of this patent is extended or adjusted under 35 U.S.C. 154(b) by 1133 days.

(21) Appl. No.: 10/576,250

(22) PCT Filed: Oct. 30, 2003

(86) PCT No.: PCT/EP03/12090
§ 371 (c)(1),
(2), (4) Date: Apr. 18, 2006

(87) PCT Pub. No.: WO2005/050414
PCT Pub. Date: Jun. 2, 2005

(65) Prior Publication Data
US 2007/0058551 A1    Mar. 15, 2007

(51) Int. Cl.
*G06F 11/00* (2006.01)
(52) U.S. Cl. ............................. 726/22; 726/23; 713/188
(58) Field of Classification Search ...................... 726/23
See application file for complete search history.

(56) References Cited

U.S. PATENT DOCUMENTS

| | | | |
|---|---|---|---|
| 5,557,742 A | | 9/1996 | Smaha et al. |
| 5,878,231 A | * | 3/1999 | Baehr et al. .................... 709/245 |
| 6,279,113 B1 | | 8/2001 | Vaidya |
| 6,408,391 B1 | | 6/2002 | Huff et al. |
| 6,513,122 B1 | | 1/2003 | Magdych et al. |
| 7,331,061 B1 | * | 2/2008 | Ramsey et al. .................. 726/23 |
| 7,469,418 B1 | * | 12/2008 | Wilkinson et al. .............. 726/22 |
| 7,640,434 B2 | * | 12/2009 | Lee et al. ....................... 713/182 |

(Continued)

FOREIGN PATENT DOCUMENTS

| | | |
|---|---|---|
| EP | 0 743 777 A2 | 11/1996 |
| WO | WO 03/010992 A1 | 2/2003 |

OTHER PUBLICATIONS

Rowe et al., "Fake Honeypots: A Defensive Tactic for Cyberspace," 2006, IEEE, pp. 223-230.*
Wan et al., "IntruDetector: A Software Platform for Testing Network Intrusion Detection Algorithms," 2001, Computer Security Application Conference, pp. 1-9.*
Byers et al., "Defending Against an Internet-based Attack on the Physical World," 2002, ACM.*

(Continued)

*Primary Examiner* — Luu Pham
(74) *Attorney, Agent, or Firm* — Finnegan, Henderson, Farabow, Garrett & Dunner, L.L.P.

(57) ABSTRACT

A method of preventing intrusion in communication traffic with a set of machines in a network is provided, the traffic including communication entities, including the steps of: providing a test system comprising test facilities replicating at least one of the machines in the set; directing at least part of the communication entities in the traffic toward the test system; running the communication entities directed toward the test system on the test facilities to detect possibly adverse effects on the test system, and i) in the presence of an adverse effect, blocking, by the test system, the communication entities leading to the adverse effect, and ii) in the absence of an adverse effect, allowing, by the test system, the communication entities not having the adverse effect to communicate with the set of machines.

34 Claims, 6 Drawing Sheets

U.S. PATENT DOCUMENTS

| | | | | |
|---|---|---|---|---|
| 2002/0069356 | A1* | 6/2002 | Kim | 713/160 |
| 2002/0184528 | A1* | 12/2002 | Shevenell et al. | 713/201 |
| 2003/0110391 | A1* | 6/2003 | Wolff et al. | 713/200 |
| 2003/0145228 | A1* | 7/2003 | Suuronen et al. | 713/201 |
| 2003/0174725 | A1* | 9/2003 | Shankar | 370/428 |
| 2004/0172557 | A1* | 9/2004 | Nakae et al. | 713/201 |
| 2005/0005031 | A1* | 1/2005 | Gordy et al. | 709/250 |
| 2006/0212572 | A1* | 9/2006 | Afek et al. | 709/225 |
| 2012/0005756 | A1* | 1/2012 | Hoefelmeyer et al. | 726/24 |

OTHER PUBLICATIONS

Zhang et al., "Honeypot: A Supplemented Active Defense System for Network Security," 2003, IEEE.*

Weiler et al., "Honeypots for Distributed Denial of Service Attacks," 2002, IEEE, pp. 1-6.*

Ptacek, et al., "Insertion, Evasion, and Denial of Service: Eluding Network Intrusion Detection", Secure Networks, Inc., pp. 1-63, (Jan. 1998).

* cited by examiner

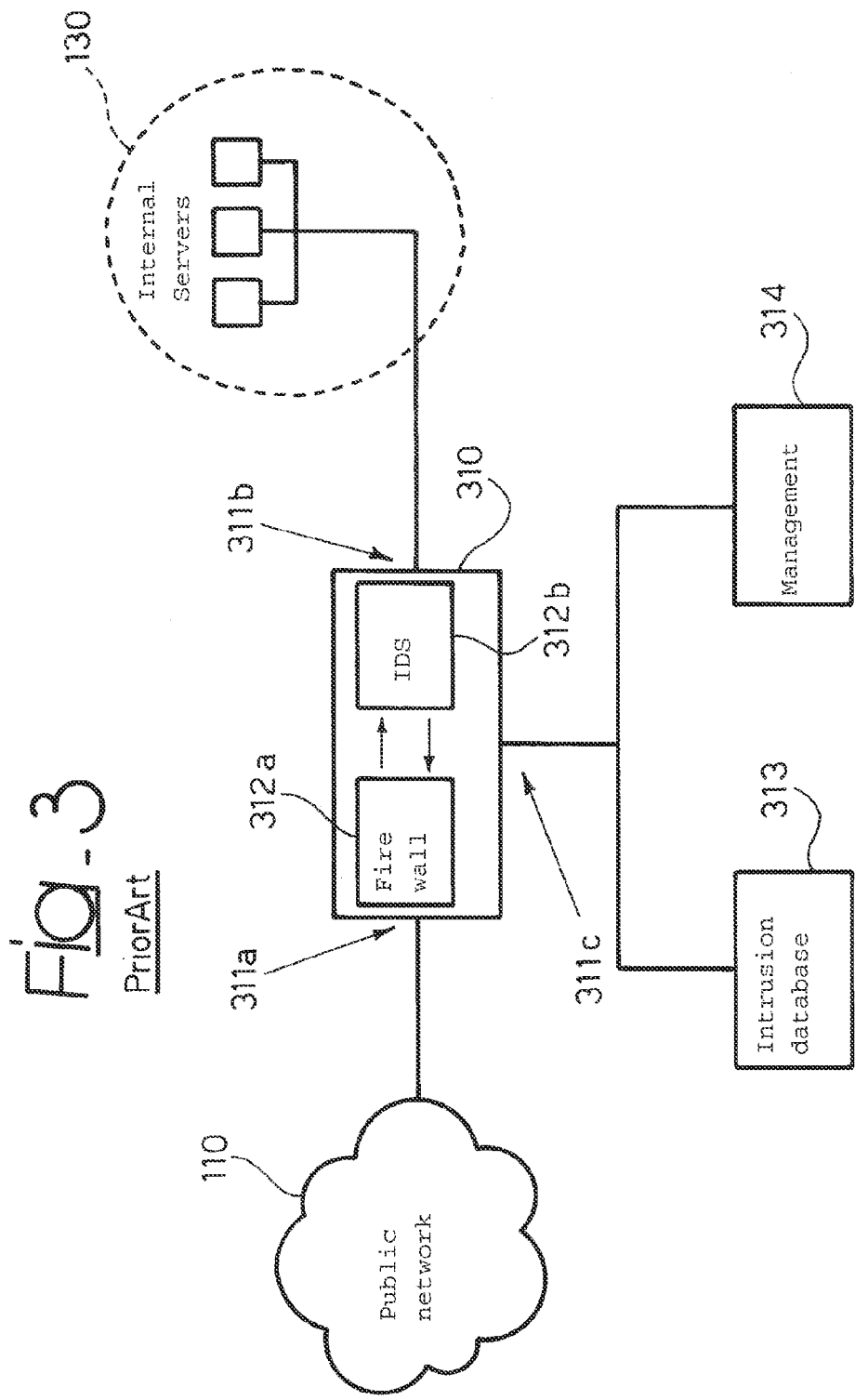
Fig. 3
PriorArt

METHOD AND SYSTEM FOR INTRUSION PREVENTION AND DEFLECTION

CROSS REFERENCE TO RELATED APPLICATION

This application is a national phase application based on PCT/EP2003/012090, filed Oct. 30, 2003, the content of which is incorporated herein by reference.

FIELD OF THE INVENTION

The present invention relates to techniques for intrusion prevention and deflection.

The invention was devised by paying specific attention to the possible application in ensuring security of telecommunication networks.

DESCRIPTION OF THE RELATED ART

Typically two types of intrusion detection systems exist at present.

A former type (usually referred to as a network intrusion detection system or network-IDS) essentially monitors traffic on a given network segment; a latter type (oftentimes referred to as a host-IDS) is adapted for monitoring events occurring on a specific system).

Both systems analyze data while searching for attacks or policy violation acts. This is done by exploiting the knowledge and recognition algorithms available in order to emit a signal or an alarm when a match is found. Both approaches have advantages and drawbacks.

Exemplary of a network-IDS is the arrangement disclosed in US-A-6 279 113.

Figure 1:
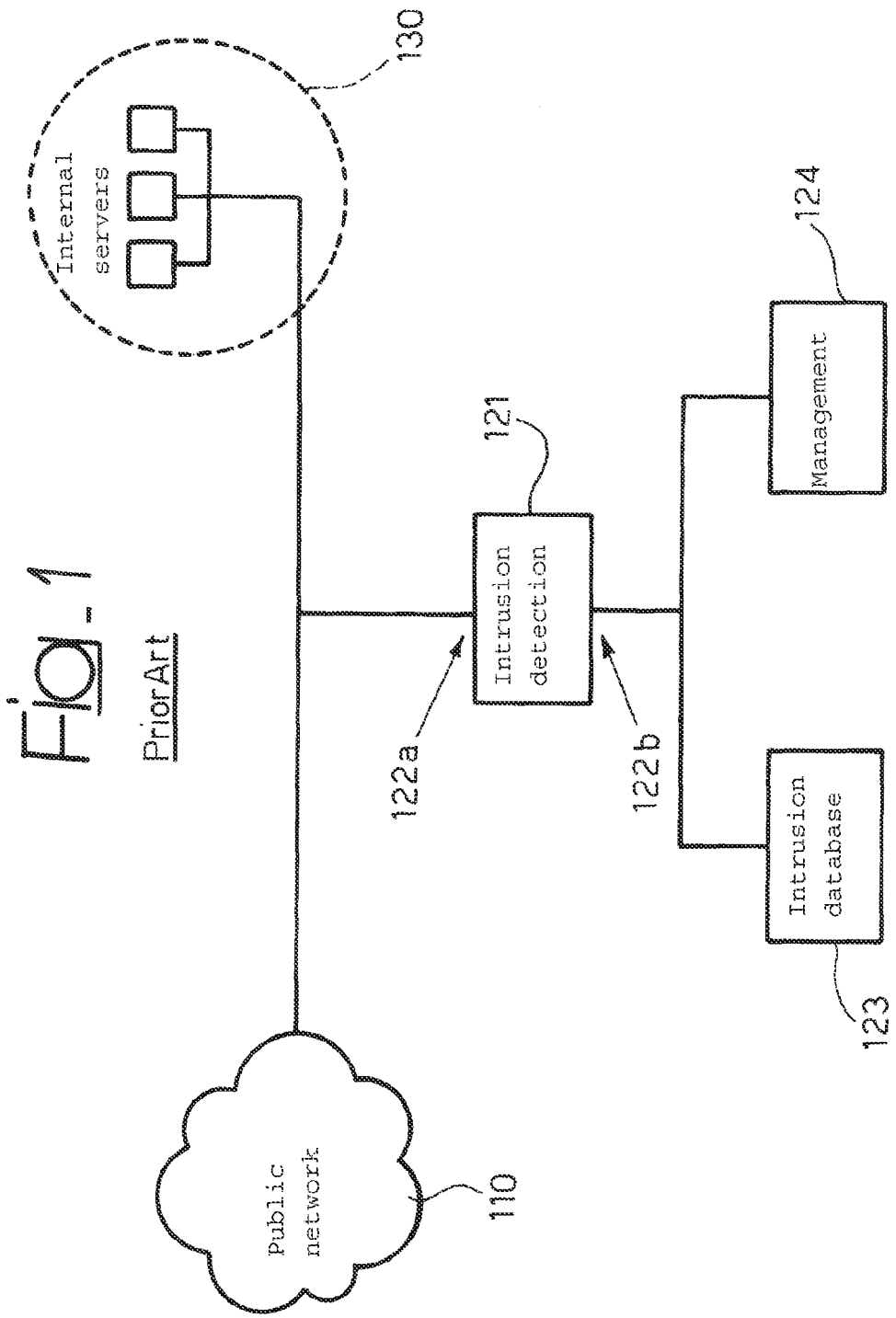

As shown in FIG. 1, in such an arrangement, an internal or inner network 130 including a set of "machines" such as e.g. internal servers is protected by an intrusion detection system including a sensor 121. The sensor 121 is adapted to monitor, via an interface 122a, the traffic towards and from the internal network 130 and an external network 110. The system monitors within the data flow those attack patterns that are known and are contained in a data base 123. In the case of such an occurrence, a corresponding alarm is issued. A control system 124 of the intrusion detection architecture is also provided that takes care of collecting alarms and presenting them to the final operator while also managing the entire system. In the arrangement shown in FIG. 1 only one sensor is shown. This is a purely exemplary representation, in that an intrusion detection network typically includes a plurality of sensors located at the critical points in the network. Also, in more complex architectures including a large number of sensors the managing system 124 may in fact be hosted on a plurality of machines.

In the arrangement shown in FIG. 1, the detection role is allotted to a network sensor 121, usually hosted on apparatus that may be either a generic computer or a specialized appliance. The sensor intercepts traffic in a section of the network. Usually, it analyzes the traffic by a comparison with a set of signatures collected in a data base 123. These must be periodically updated, and this operation must be timely performed by the manufacturer/operator whenever new types of attacks become known. Otherwise, the detection system will lose its effectiveness. The signatures in question usually include an attack pattern: therefore, even a relatively minor change in the pattern makes recognition impossible. For that reason, the most sophisticated sensor types usually perform a normalisation operation of the flow of the most common protocols in order to create the best conditions for verification. Certain types of network-IDSs combine pattern matching with a mechanism for analyzing anomalies, namely variations with respect to the expected behaviour of a given protocol. These techniques follow the approach currently referred to as protocol anomaly detection.

Such a system has a number of advantages.

As a first point, a large network can be monitored by means of a few, properly located network sensors.

Further, such a system has a minimum impact on the network. The sensors are located at critical points in the network where they monitor traffic without adversely affecting performance.

The implementation effort is minimum. The sensors are separate entities with respect to the machines monitored, and consequently are also independent from them. The same sensor is thus adapted to protect machines with different operating systems, providing different services and so on.

Additionally, the sensors can be made totally undetectable with respect to the network being monitored based on what is currently referred to as a "stealth" configuration. Usually the network sensor is provided with the two communication interfaces: a first one (122a—see again FIG. 1) is configured in a mixed manner for intercepting traffic; the second one (122b) in configured in a traditional manner in order to permit managing operations. The monitoring interface is not provided with an IP address, and therefore cannot be addressed. The absence of an IP address makes it practically invisible to a possible intruder.

The main disadvantage of such a network-based IDS lies in that it does not have a precise knowledge of the status (services offered, software used, actual vulnerability, and so on) of the machines coming down to the network segment 130 being controlled. The system activity is limited to monitoring traffic by searching for attack pattern, without knowing whether these represent an actual threat for the systems to be protected.

This entails a reduced effectiveness in detection and increases in the number of false alarms. Any time an attack pattern is detected, such a system issues an alarm, having typically a variable degree of seriousness depending on the attack type. This approach produces a huge amount of signalling (in a large network, a single sensor may generate one thousand such alarms per day), thus making it very difficult, if not impossible, to manage such a tool. Additionally, a good deal of the alarms are in fact false alarms: in fact, the network sensor does not operate in an intelligent manner and issues alarms also when the dangerous packet is addressed to a non-existing machine (this being a typical situation generated by tools adapted for automatically generating attacks) or when the machine is not vulnerable to a given attack, because it does not provide a specific service or is equipped with an updated and protected software release. This situation leads to handling huge amounts of largely irrelevant data, which may be however be reported with a high degree of gravity, with the risk of however somehow hiding real alarms and diverting time and resources from the task of tackling with actual problems.

Another intrinsic limitation of a network-based IDS system is related to insertion and evasion processes as described e.g. by T.H. Ptacek and T.N. Newsham in "Insertion, evasion and denial of service: eluding network intrusion detection", Secure Network Inc., January 1998, this being a reference text as regards intrusion detection systems.

In fact, the IP protocol provides the possibility for certain packets to be fragmented, that is broken up in smaller packets before being sent over the network. The maximum size of an IP packet being 65,546 bytes (roughly 64 KB) is poorly adapted to be transmitted over different networks. For instance, the maximum size of an Ethernet frame is 1,500 bytes; in the case of a Token-Ring network such size is 4 KB. In general, the so-called maximum transmission unit (MTU), namely the maximum packet size that can be transmitted at the data-link level can significantly vary from network to network. It is thus evident that such a parameter would limit the maximum dimension of the IP packet to be transmitted. Fragmentation is therefore provided in the IP protocol in order to permit data to be conveyed over different types of networks, in a thorough transparent manner with respect to the upper level protocols and the final user.

Within the heading of an IP packet essentially two fields exist for a correctly managing fragmentation: the Fragment Offset field, and the More Fragment (MF) Flag. The offset field identifies the position of the packet transmitted within the data flow, thus making it possible to reconstruct the correct order of the packets, while the MF flag distinguishes the last fragment from the others. The packets are therefore reassembled by the final user by using this information.

It is therefore of paramount importance for the intrusion detection system and the machines protected thereby to exhibit the same behaviour in respect of fragmented IP packets received. In that way, it is possible to avoid the so-called insertion and evasion phenomena that may strongly jeopardise the effectiveness of an intrusion detection system.

An insertion takes place when the IDS accepts and considers as valid certain packets that would have been dispensed by the end-system to which they are sent, while evasion occurs when the IDS does not take into account packets that would be accepted by the end-system. In fact, if the intrusion detection and the end-system to which the data are addressed are exposed to different traffic flows, the risk exists that an attack may be unobserved by the detection system, while reaching the final target.

The same time problems arise when the need exists of re-constructing TCP (Transmission Control Protocol) level data flows. TCP does not implement a fragmentation function, but provides to the upper layer an abstraction which is similar to a continuous flow of characters coming from a file while ensuring the order and integrity of these data. These functions are implemented by means of a timeout and re-transmission mechanism.

Each TCP connection is identified by means of a sequence number. That number is chosen based on a criterion dependent on the operating system of the apparatus starting the connection and is increased of a quantity equal to the number of bytes received and acknowledged by means of an acknowledgement indicator (ACK). The sequence number contained in the TCP header is the only data item that makes it possible to identify the status of a given connection and to identify and order the data within the flow being transmitted.

However, it is possible for a packet to be re-transmitted, when the ACK packet is not received within a certain time or if an error has occurred during transmission. Re-transmission makes re-construction of the traffic flow by an intrusion detection system more complex, in that a packet being re-sent is intercepted by the IDS more than once. The intrusion detection system sees two identical packets being transmitted, without however being in a position to tell which of the two was actually accepted by the addressee.

A network-based intrusion detection system has in fact no warranty and no way for discovering whether a given packet has been accepted or dispensed by the end system being monitored. Again, insertion phenomena (the IDS accepts and considers as valid packets that are dispensed with by the end-system) and evasion (the IDS does not take into account packets that are accepted by the end-system) result in a strong limitation in the detection effectiveness of the systems.

Both in the IP and in the TCP protocols other fields exist that may be manipulated for insertion and evasion purposes (in that respect, reference can be made again to the article by Ptacek already cited in the foregoing), therefore annihilating the efficiency of a network-based IDS.

In brief, the basic problem making a network-based IDS vulnerable to insertion and evasion lies in that the IDS and the end-system may in certain contexts be exposed to two different data flows as they are separate machines, with distinct operating systems and implementations of the TCP/IP stack. An attacker may thus take advantage of this situation to launch an attack that is invisible for the protection system.

This limitation and the drawbacks referred in the foregoing do limit the detection capability of a network-based IDS and essentially derive from the reduced knowledge available to the intrusion detection system in respect of the status and configuration (operating system, software used, services offered, actual vulnerability and so on) of the machines coming down to the network segment being controlled.

Figure 2:
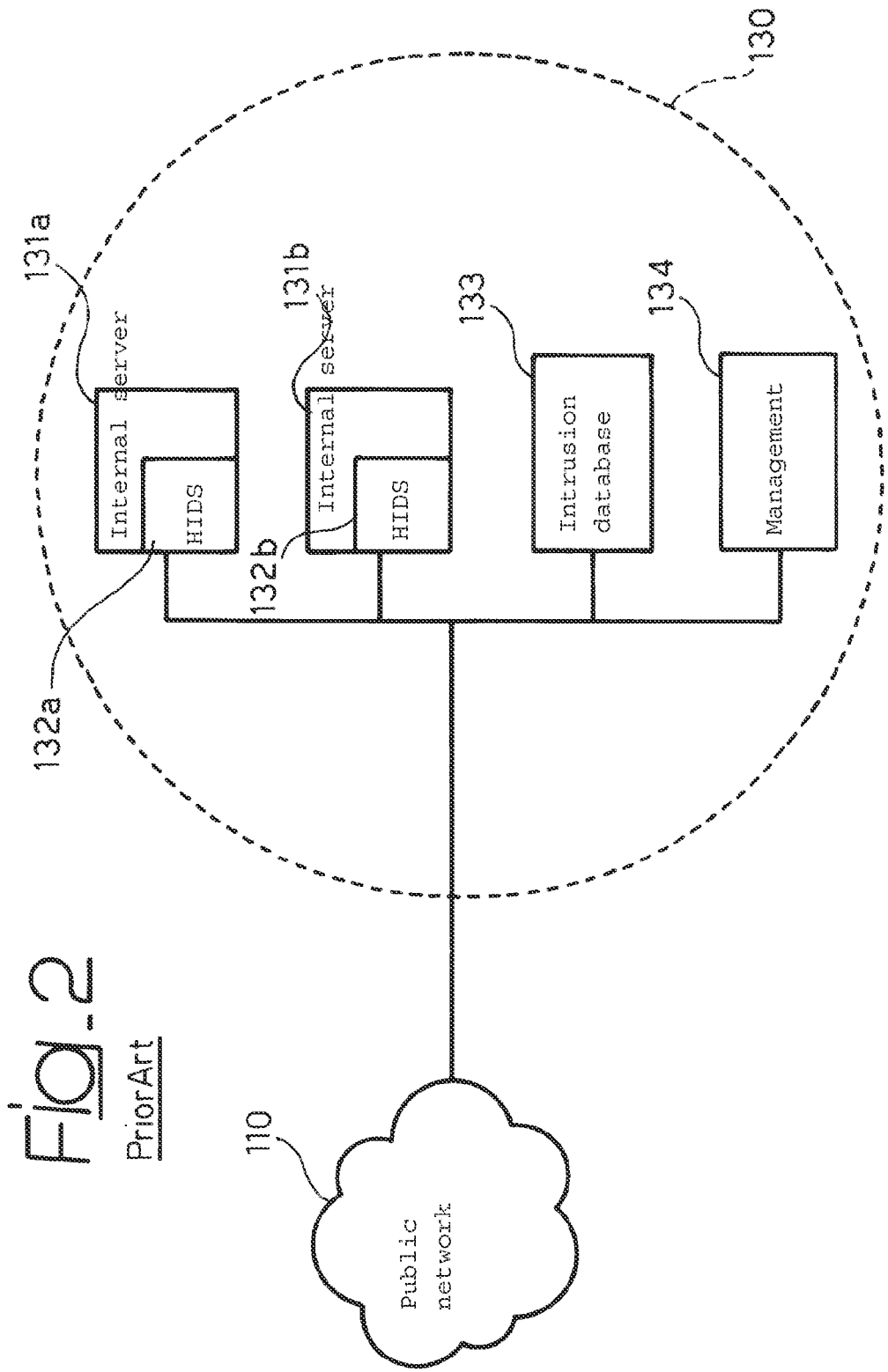

A substantially different approach, that dispenses with these limitations, is represented by a host-based IDS as shown in FIG. 2. An example of such an intrusion detection system of the host-based type is disclosed in US-A-5 557 742.

In this case, the intrusion detection facilities are no longer a separate entity from the machines being protected. Specifically, on each machine 131 of the internal network 130 to be protected a sensor 132 is installed that controls the status of the associated machine by monitoring, for instance, the file system, the network activity and the level or resource utilization. Typically, a data base 133 is provided containing the signatures of the known attacks and the respective policies as well as a control system 134 that takes care of collecting and processing the alarms generated by the individual sensors, while also managing the entire system. Again, real solution may exist based on more complex architectures.

Host-based intrusion detection techniques provide in fact for the use of special programs 132a, 132b, . . . , that are installed and run directly on the systems being monitored 131 and are adapted to operate at the kernel or application level, for instance to intercept the system calls.

Essentially, a host-based IDS has a "local" view and controls the status of the machine on which it is hosted by monitoring for instance the file system, the network activity and the level of resource utilization. Such a system thus provides a definitely improved performance in detecting attacks having an impact or leaving a trace on the system. Additionally, it may detect attacks that do not come via the network, such as e.g. those intrusions performed via a console, by acquiring higher privileges by a user, typically an insider, or attacks to applications.

In order to provide a truly effective intrusion detection system of the host type, the detection component must be installed on the systems being protected. Consequently, the software is specialised for the types of operating systems onto which they must be installed; specialized solutions therefore exist for Microsoft, Solaris, Unix systems and so on.

Being directly hosted on the system controlled a host-based system (HIDS) system is open to attacks and runs the risk of being disabled as is the case for any other programs running on the same machine. A host-based intrusion detection system may thus be disabled by means of a certain denial-of-service attacks. In fact, the sensor is sensitive to such commands exactly as the system that hosts it.

The basic limitation of such a system is consequently related to its highly invasive character. In order to provide a host-based intrusion detection system, a specific software component must be installed on each machine monitored, which may also be a low-level working software (for instance a kernel module in a Unix system). This may lead to a reduction of performance in the machine or, even worst, to conflict with other applications already installed. Additionally, specific configurations for each machine are required in order to adjust detection and improve the effectiveness thereof. This issue becomes even more critical when "production" machines are considered offering critical services, whose configuration can not be modified in order to avoid the risk of making them unstable.

Additionally, a good intrusion protection system must be in a position to block attacks detected before these produce a damage on the systems protected. Most traditional systems are unable to provide active responses in the face of an attack detected; they merely perform their role by providing a more or less detailed alarm (depending on the specifications given by the administrator and the lock in capacity of the tool) by means of different communication channels (starting from blinking signal on a console to a personal e-mail message).

Conventional techniques therefore exist that also provide an active response, namely imply an actual action directed at interrupting the dangerous traffic flow towards the inner network systems. These include killing sessions and immediately updating the firewall rules.

Session killing is the most common and simple way of reacting to an intrusion detected: an error message in the network (such as destination unreachable ICMP packet or a TCP protocol reset included in the RST flag) received by the TCP/IP stack causes communication to be closed down. In the face of an attack detected, the IDS system sends out suitably "spoofed" TCP RST or ICMP packets in order to render the machine being attacked unreachable for the attacker itself, thus blocking the dangerous session.

Such a technique must be implemented in such a way to be fast: if the system does not react promptly, it may not be able to block the dangerous traffic flow or may finally intervene when the damage has already occurred. One simply has to think of an attack whose dangerous content is limited to a single packet: this is a limit case where a counter-measure as described is totally useless.

An arrangement resorted to in certain intrusion detection systems for reacting to an attack thus provides for co-cooperation with a firewall, by modifying in real time the rules thereof. In that way, the intrusion detection system "teaches" the firewall in order to cause it to drop all those connections coming from the IP address of an attacker detected in order to block the dangerous traffic flow. Depending on the different implementations, the added rule(s) may be cancelled after a given period of time or several attacks are required for isolating a certain IP address.

However, this technique may not be exempt from the same limitations affecting the other techniques considered in the foregoing. It is effective in the case of attacks exploiting a shell obtained by means of an exploit (in which case the exploit is executed, but the shell obtained is no longer reachable), but it turns out to be useless in the case of those attacks, such as denial-of-service (DOS) attacks, which exhaust their contents in few packets, or even just one packet.

An intrinsic limitation of these techniques is that they are not prevention techniques, in that they do not act before the packet reaches the target. In fact, they react only after an event occurred and the reaction, however fast, always follows the occurrence of a suspicious event, such as the transit of a given packet. The only acceptable way of overcoming this limitation is to integrate in the intrusion detection system a firewall function by realising an in-line intrusion detection system.

Such an arrangement is disclosed e.g. in US-A-6 513 122 and is generally portrayed in the block diagram of FIG. 3.

Specifically, the block diagram of FIG. 3 shows the architecture of an in-line intrusion detection system 310, wherein the internal network 130 is separated from the external network 110. Such a system can be regarded as an evolution of the network-based shown in FIG. 1, wherein the network sensor becomes a bridge separating the network to be protected from the external network.

The system typically includes three network interfaces, two of which (311a and 311b) operate at the second level ("level 2") of the TCP/IP stack by enabling the device to act as a bridge while maintaining invisibility at the network level. These interfaces monitor all the traffic in transit from and towards the internal network 130. A third interface 311c manages the system. The device collects all the traffic from and towards the internal network 130 and detects, via the intrusion detection component 312b the known attack patterns contained in the data base 313. In the presence of an attack, via the firewalling component 312a, the system can prevent the single dangerous packets from traversing the device and reaching the target, thereby implementing an intrusion prevention action. Reference 314 designates a management module of the system.

Again, the exemplary block diagram shown in FIG. 3 corresponds to a simplified architecture: real situations may in fact involve a more complex architectural solutions.

In comparison with the more traditional arrangements discussed previously, the arrangement shown in FIG. 3 operates as a sort of a bridge between the outer network 110 and the network to be protected 130, acting as a gateway for the internal network. By operating at level 2 with the interfaces 311, it maintains the typical IP invisibility of a network-based system. Additionally, the intrusion detection system 310 shown in FIG. 3 collects, by acting as a gateway for the internal network, all the traffic from and towards the network managing it by means of integrated firewalling functions (312a) and intrusion detection functions (312b). In that way the system may analyse the traffic, searching for "suspect" packets. When detecting an intrusion (by means of the component 312b), it can thus block the intrusion by means of the firewall component 312a, by preventing it from being passed on to the other interface.

This reaction technique acts before a suspect packet reaches the target, thereby implementing a true prevention mechanics. The limitations of the prior art arrangement considered in the foregoing are thus overcome, with the possibility of detecting and blocking also attacks contained in a single packet.

However, even the arrangement shown in FIG. 3 still suffers from the drawbacks described in the foregoing and related, as is the case of network-based systems, to the lack of precise knowledge of the status of the machines coming down to the network segment 130 being controlled. In fact, also the arrangement shown in FIG. 3 limits its intervention to monitoring traffic while searching for attack patterns, without however knowing whether this may represent an actual threat for the systems protected.

OBJECT AND SUMMARY OF THE INVENTION

The object of the invention is thus to provide an arrangement for protecting systems and networks from intrusions, adapted to detect the dangerous packets before these may reach the machines in a protected network.

Specifically, the invention aims at providing a system adapted to tackle also with "unknown" attacks while ensuring security of e.g. production machines, on which no dedicated software is currently installed.

By "unknown" attacks, those attacks are generally meant that were not previously experienced by the system and/or for which no information has been previously stored in the system.

According to the present invention, that object is achieved by means of a method having the features set forth in the claims that follow. The invention also relates to a corresponding system, a network equipped with such a system as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one" computer is evidently intended to highlight the feasibility for the arrangement of the invention to be implemented in a de-centralized fashion.

A preferred embodiment of the invention therefore prevents intrusion in communication traffic with a set of machines in a network, the traffic comprising communication entities identified by respective patterns. A test system including test facilities replicating at least one of the machines in the set is provided and at least a part of the communication entities in said traffic are directed towards the test system, where they are run on the test facilities to detect possibly adverse effects on the test system. In the presence of an adverse effect, the communication entities leading to the adverse effect are blocked. In the absence of an adverse effect, communication with the set of machines protected is allowed for the communication entities failing to lead to an adverse effect.

The communication entities directed towards the test system include communication entities taken from traffic bound towards and/or coming from the set of machines protected.

The arrangement described herein thus achieves protection by "virtualizing" the real, protected machines on a set of test machines.

The arrangement described herein is particularly suitable for use in association with a protected network subdivided in areas grouping similar systems, each area being protected by an in-line system including intrusion detection, intrusion deflection and test system components.

In a preferred embodiment, the system recognizes the dangerous, "harmful" communication entities (e.g. packets) and the allowed, "harmless" packets by blocking the former and allowing the latter to pass: this is done on the basis of respective identifier patterns stored in two data bases. The intrusion deflection component deflects towards the test component those packets whose nature and possible effects on the machines protected are unknown (i.e. not known with sufficient reliability). The test component system, where the systems and services of the internal network (i.e. the machines protected) are replicated, "runs" the communication entity and thus checks the real effect thereof on the system replicated.

In the case the test demonstrates a dangerous, negative effect, the packet is not returned to the deflection system and therefore is not able to reach the protected machines of internal network. In the case the packet is checked to represent a "good" one, it is re-directed towards the intrusion deflection component to be forwarded to the machines of the internal network. In both cases the respective identifier patterns (i.e. the signatures) may be used to update the databases possibly present in the intrusion detection component.

To sum up, the arrangement described herein provides an architecture which maintains the advantages of all the arrangements of the prior art, while dispensing with the intrinsic drawbacks of those intrusion detection systems (of the network-based type) having insufficient knowledge available of the final systems. The arrangement described herein also avoids the intrinsic invasive nature of a host-based intrusion detection system, while ensuring that potentially dangerous traffic is blocked and not allowed to propagate to the protected machines.

BRIEF DESCRIPTION OF THE ANNEXED DRAWINGS

Figure 4:
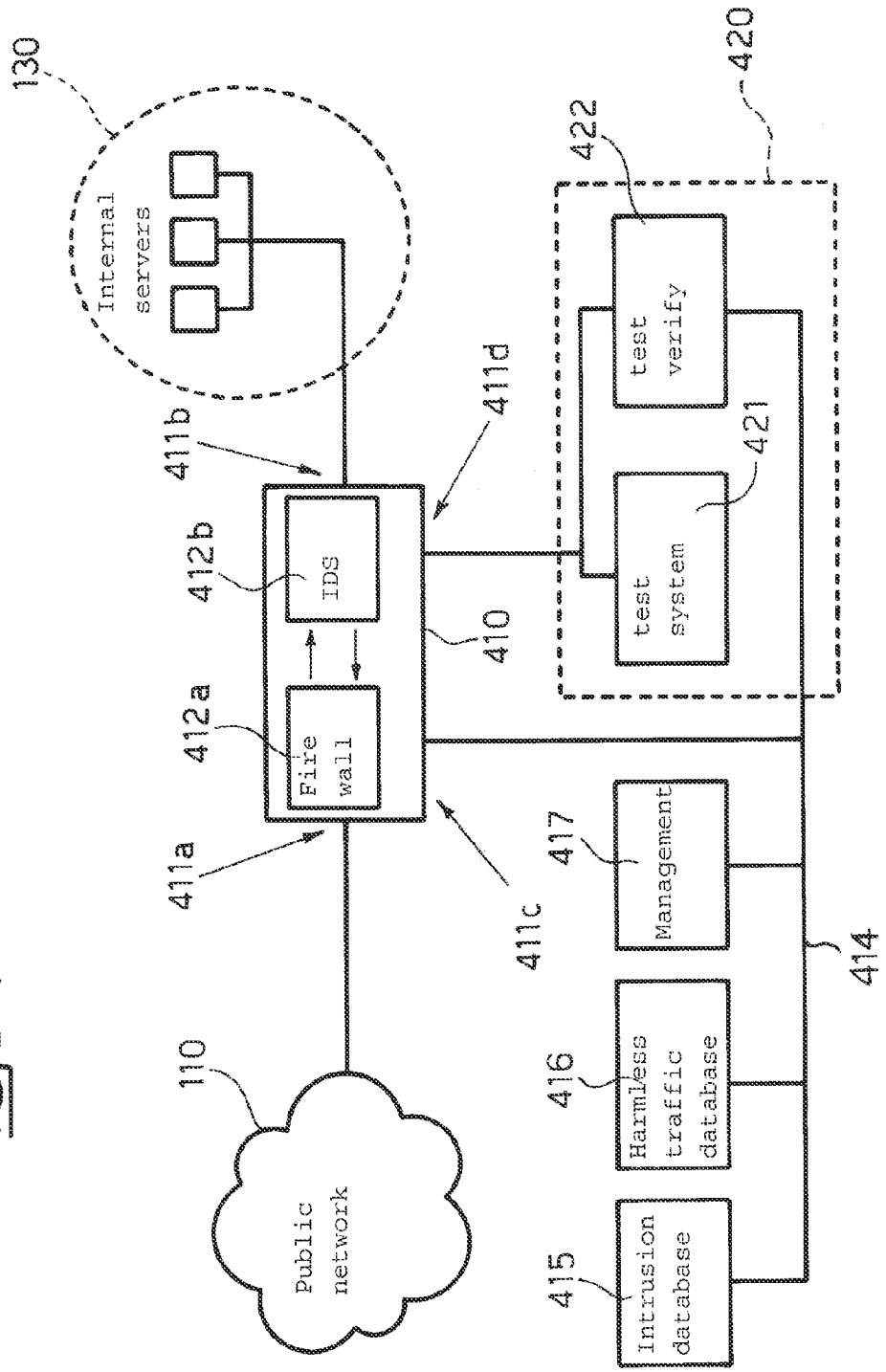
Figure 5:
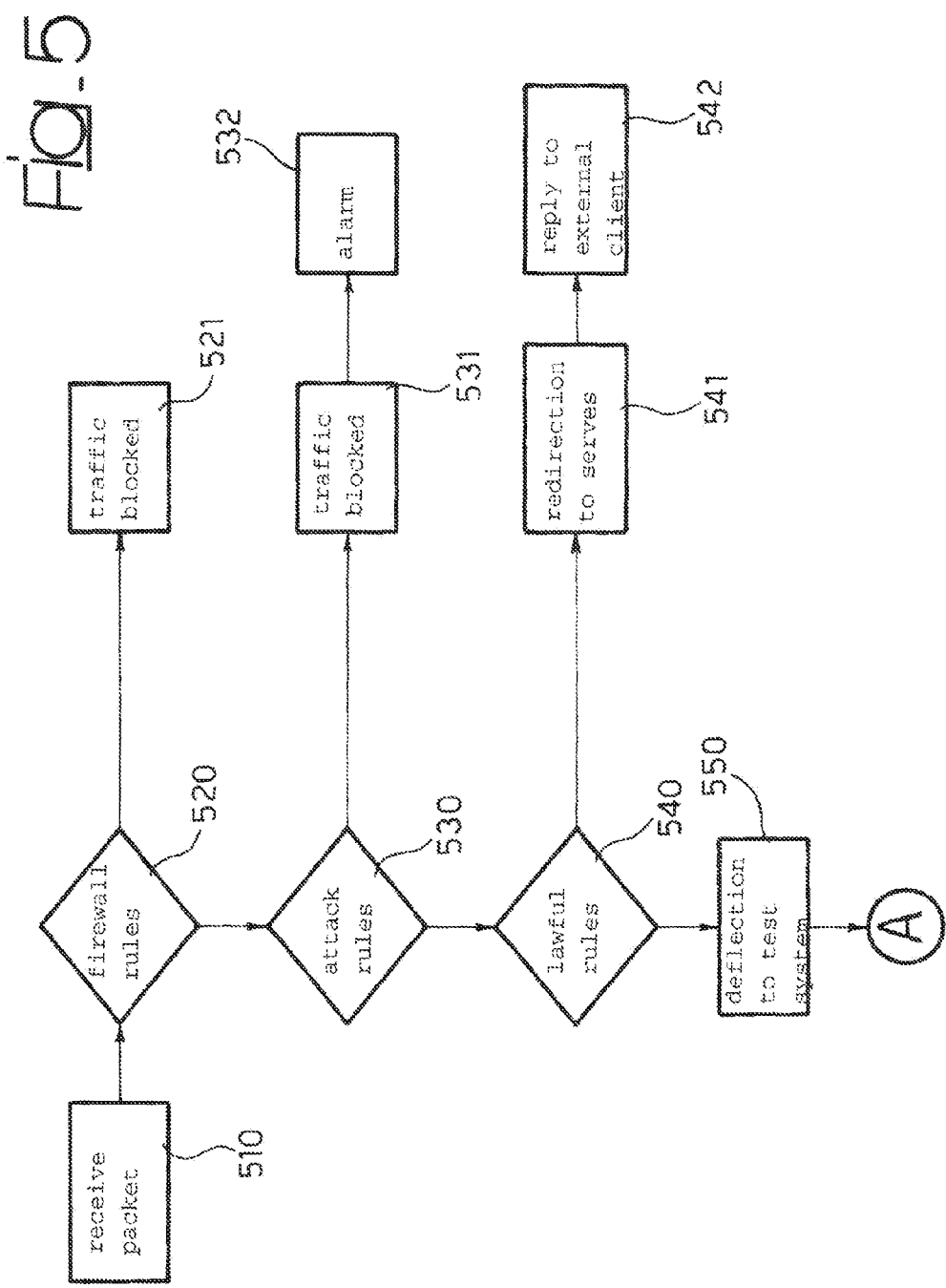
Figure 6:
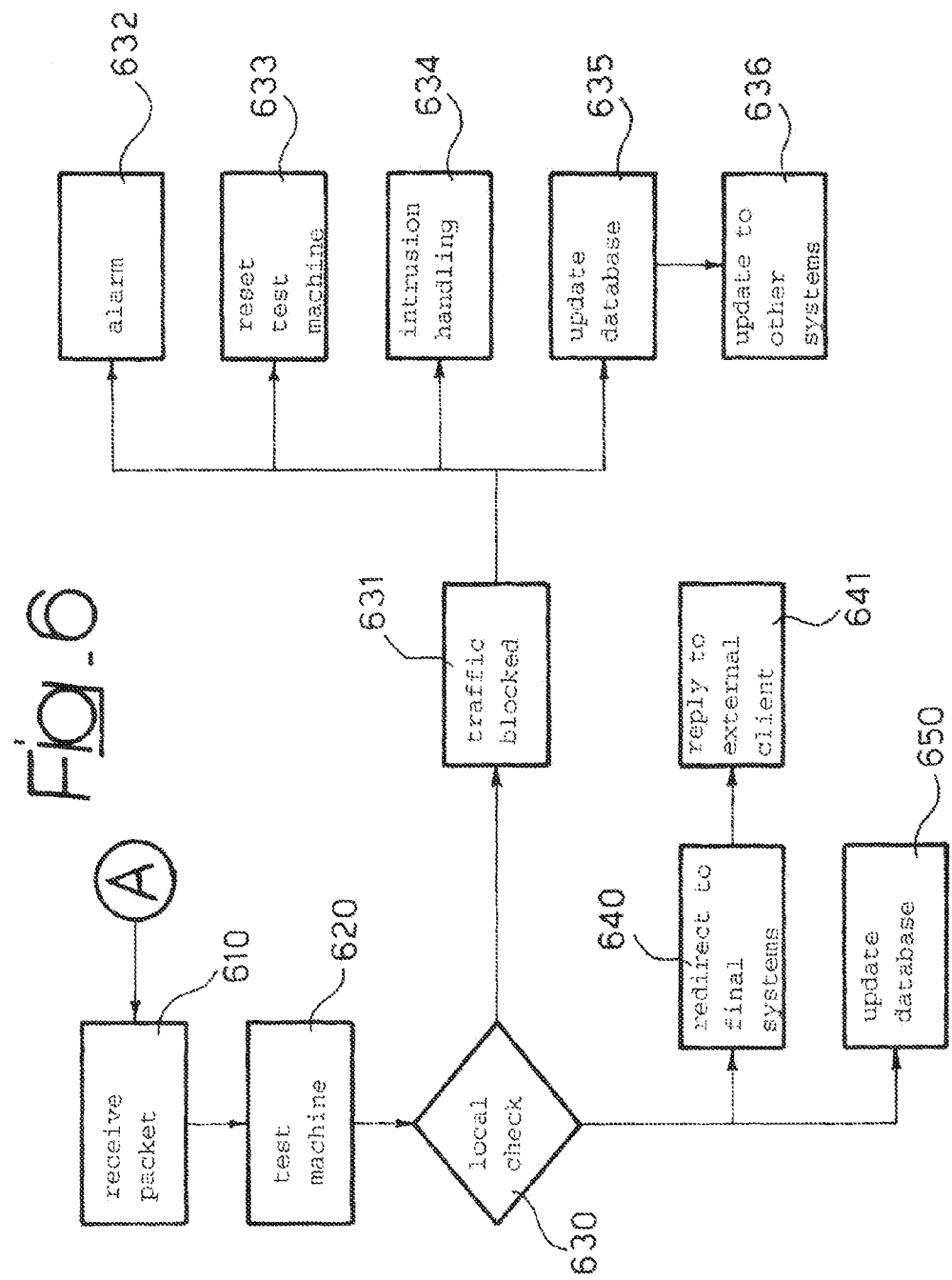

The invention will now be described, by way of example only, by referring to the enclosed figures of drawing, wherein:

FIGS. 1 to 3, related to the prior art, have been described previously,

FIG. 4 is a block diagram showing the general layout of an arrangement as described herein, and FIGS. 5 and 6 are flow charts exemplary of operation of the arrangement described herein.

DETAILED DESCRIPTION OF PREFERRED EMBODIMENTS OF THE INVENTION

As previously indicated, the exemplary arrangement described herein provides network protection through the joined action of the two basic components, namely a network component that collects and analyzes the network traffic via an inner-line element, and a component that, even though different from the final machines, operates at a local level.

In most instances the servers to be protected are production machines whose configurations are not adapted to be modified, and wherein new software components are not suitable to be installed in order to avoid service instability.

The arrangement described herein therefore creates a test ambience wherein the services and the configurations of the machines in the internal network are replicated. The test ambience permits the effect of any potential dangerous communication entity (e.g. a packet) to be tested before this actually reaches the real service. In the case the packet is found to be a good one, it is re-directed towards the machines in the internal network. Otherwise it is blocked. In that way an architecture is provided for intrusion prevention wherein attacks are detected and blocked before they may reach the target, thus significantly reducing the number of positive false alarms in that packets are blocked only after checking whether they are truly dangerous. Additionally, the arrangement described herein is also effective in detecting unknown attacks, namely attacks for which a signature is not available yet.

Specifically, the block diagram of FIG. 4 shows an internal network 130 separated from the external network 110 by means of an in-line component 410. That component includes four network interfaces, two of which (those indicated 411a and 411b) operate at level 2, by permitting the device to act as a bridge while maintaining invisibility at the network level and also monitoring all the traffic in transit from and towards the internal network 130.

A third interface 411c provides management of the system, while a fourth interface 411d connects the in-line component to the test ambience 420.

The in-line component analyzes all the traffic from and towards internal network 130. By means of the intrusion detection component 412b, it detects any "unlawful" or "harmful" attack patterns of a known type (i.e. those communication entities whose signatures are contained in the data base 415). In the case of such an occurrence, the system prevents, via the firewalling component 412a the single dangerous packets from traversing the device and reaching the target, thereby performing an intrusion prevention action.

Conversely, the traffic acknowledged to be "lawful" or "harmless" (i.e. those communication entities whose signatures are contained in the data base 416) is allowed to traverse the in-line component 410 thus reaching the servers in the internal network 130.

When the in-line component 410 receives packets that are not recognizable either as lawful or as unlawful, based on the signatures contained in the data bases 415 and 416, the packets in question are re-directed towards the test ambience or environment 420 via the interface 411d.

The test ambience 420 is comprised of one or more test machines 421 that replicate the servers or, less preferably, part of the servers (ultimately, even a single server), in the internal network 130 and a system 422 adapted to verify the status thereof in order to detect the possible attacks. In a minimal implementation the system 422 may coincide with a host-based intrusion detection system as shown in FIG. 2.

After testing, those packets held to be lawful are given back to the in-line component 410 that re-directs them to the servers in the internal network 130, while the unlawful packets are blocked.

The test ambience is also connected to the management network 414 to permit updating the information contained in the data bases 415 and 416. More in detail, each single packet is analyzed via the joint action of the firewalling module 412a and in the intrusion detection module 412b.

In the first instance, the firewalling component 412a checks the lawful nature of the packet: for instance this is done by carrying out packets filtering on the basis of the addresses and the source and the destination ports, while blocking possibly unlawful packets. Subsequently, the intrusion detection module 412b analyzes the application contents of the packet on the basis of the contents of the data base 415, that contains the known attack patterns to be blocked, and the data base 416, that contains those patterns included in the explicitly permitted traffic.

If the component 412b detects an attack, this is blocked before it may reach the systems in the internal network. Conversely, if an explicitly permitted traffic entity is detected, such traffic is allowed to traverse the system and reach the network 130 via the interface 411b.

The rest of traffic, that is neither explicitly lawful, nor explicitly unlawful, is regarded as "suspect" traffic.

It will be appreciated that the prior art systems of FIGS. 1 to 3 do not handle such "suspect" traffic: as a function of the occurrence, this is handled either as lawful, and let pass, or as unlawful and thus blocked. That way of operating increases the risk of generating both negative false alarms (unlawful traffic that is handled as lawful traffic) and positive false alarms (lawful traffic that is handled as unlawful traffic).

Conversely, in the arrangement described herein, the suspect traffic is diverted towards the test system 420 via the interface 411d. The test machines 421 receive all the suspect traffic collected by the interface 411a and process each single packet therein in the same way such packets would be processed by the "real" machines in the internal network 130.

In practice, the system 422 checks the status of the machines, by detecting intrusion at the level of local detail (which would be unfeasible for a network-based sensor), while also having the possibility of verifying the effect of each single packet, or even each single command, on the machines themselves. In that way, all the suspect traffic is processed and, depending on the outcome of such processing, is finally classified by the test system 422 as lawful or unlawful, without possibility of errors.

In a suspect packet is found to be lawful, it is re-directed to the in-line component 410 of the system, which in turn forwards it to the final user, that may thus prosecute communication. Conversely, if a suspect packet is found to be unlawful, it is not sent to the in-line system, nor is any response from the test machines 421 sent towards the external network 110. The packet is blocked and the corresponding alarm reaches the operator via the management system 417.

It will be appreciated that, by exploiting the co-operation of two different types of intrusion detection arrangements, one of the network type 412b, included in an in-line element 410, and a component of the host-based type, integrated in the test system 420, the arrangement described herein overcomes the intrinsic limitations of traditional approaches by dispensing, on the one side, with the problem of false alarms, while, the other side, solving the problem related to the invasive nature of the host-based system.

Operation of the arrangement shown in FIG. 4 will now be described by specifically referring to the flow charts of FIGS. 5 and 6.

In a step 510, each packet received is processed by the firewalling element 412a, that operates at the network and transport level. Therefore, the header data at levels 3 and 4 are analyzed in a step 520 to check the lawful nature of the traffic from and towards certain specific IP addresses and ports and possibility blocking—in a step 521—unlawful traffic.

Subsequently, in a step 530, the packet is analyzed by the intrusion detection element 412b that detects attacks on the basis of the signatures contained in the data base 415. An attack can be conveyed by one or more packets at level 3 (for instance a so-called Ping of Death), at level 4 (for instance SYN Flood) and the application level (for instance a so-called Buffer Overflow).

When an attack is detected, the corresponding packet is blocked in a step 531 and is not re-directed towards the interface 411b. Consequently, it does not reach the servers in the internal network 130 while a corresponding alarm is issued in a step 532, which reaches the network administrator via the management system 417.

If no attack is detected, a similar pattern matching process is started in a step 540 to check the possibly explicit lawful application contents of the packet. The corresponding signatures are contained in the data base 416 and are typically signatures reporting the patterns of lawful request that the servers obtained from their clients.

Consequently, these patterns are strongly dependent on the application services provided by the machines in the internal network 130. If explicitly lawful or allowed, each single packet is re-directed to the final servers in a step 541 via the interface 411b. The servers take care of processing the packet, which generally involves issuing, in a step 542, a response towards the clients in the external network 110.

If the packet does not correspond to any of the signatures in the data base 416 and in the data base 415 as well, then one has to do with an "unknown" element that is neither explicitly unlawful, nor explicitly lawful or allowed. Such a packet is therefore handled as a suspect element.

Specifically, such a suspect traffic is deflected towards the test system 420 via the interface 411*d*, which occurs in a step 550. The test ambience 420 receives all the suspect packets and handles them as shown in FIG. 6.

Each packet received in step 610 is processed by the test machines 421 in a step 620. Specifically, the test machines 421 replicate the servers in the internal network 130: a test system 422, which—as indicated—in a minimal implementation may correspond to a host-based intrusion detection system as shown in FIG. 2, checks the status of the machines 421 for detecting the possible intrusion in a step 630. The detection system 422 operates at a local detail level and therefore may check the effect of each single packet, or each single command, on the machines themselves.

If a suspect packet is found to be lawful, in a step 640 it is re-directed, via the interface 411*d*, to the in-line component 410 of the system, which in turns forwards it to the final systems in the internal network 130. These may therefore continue, in a step 641, communication with the clients in external network 110. Alternatively, the packet can be re-directed to the in-line component 410 through the management network 414.

Conversely, if a suspect packet is found to be unlawful, in a step 631 it is blocked, in that it is not re-directed to the in-line component, nor any possible response is sent from the test machines 421 towards the external network 110.

Additionally, a set of parallel independent actions is carried out in the step 632 to 635.

First of all, an alarm is generated in step 632, that reaches the network administrator via the management system 417.

A reset action is also effected in a step 633 for the possibly compromised test machine(s). Such a step may consist, for instance, in restoring a partition in a disk based on an image thereof previously generated and stored in the system 422 that, by controlling the test machines, manages the whole ambience 420. Additionally, by resorting to traditional techniques, killing of the on-going session can be carried out in a step 634 once the unlawful nature of the communication is established.

The arrangement described performs a step 635 of updating the rules contained in the data base 415. This is intended to progressively improve the effectiveness of detection. Once checked the dangerous nature of a given traffic flow, the test system 422 may revise the rules contained in the data base 415 that rule the behavior of in-line component 410 in the system in such a way that, if said traffic flow manifests itself again, this is immediately blocked, without being re-directed to the test system.

Additionally, the system may include a mechanism for transmitting, in a step 636, the updating information towards other intrusion detection systems, possibly of a traditional type, in such a way that these systems may exploit the new signatures for detecting intrusion. In that way, an effective approach is implemented for automatically generating signatures in the presence of new attacks.

Similarly, if the packet is found to be lawful, in a step 650 the rules in the data base 416 are correspondingly updated.

This synergy of the host-based component and in-line component in the system, which leads to an improved effectiveness in the detection, is carried out by means of the management network for 414, to which both the test systems 422 and in-line component 416 come down.

In that way, the system described issues, in steps 532 and 632, alarms only upon the occurrence of a real intrusion i.e. only in the presence of the packets that, traversing the firewall 412*a*, would reach the systems in the internal network 130 with a possibility of adversely affecting operation thereof.

This signaling action has a purely informative value, since any dangerous attack has already been blocked by the components in the systems such as the in-line component 410 or the test ambience 420.

In fact, the machines in the internal network 130 are addressed only the traffic that:
  in the step 541, is held to be explicitly lawful as the respective signatures are contained in the data base 416, or
  has been positively tested without causing any damage in the test machines—in the step 640.

The dangerous traffic is thus prevented from reaching the internal network, thereby giving rise to an intrusion prevention situation.

To sum up, all the traffic from and towards the internal network 130 is analyzed in the system, in the in-line component 410 and, possibly, the host-based component integrated in the test system 420.

An attack is recognized and blocked by the in-line component 410 (if its signature is present in the data base 415) or by the test system 420 (which in turn updates the signatures in the data base 415).

Conversely, the lawful traffic is recognized by the in-line component (if explicitly allowed by a policy in the data base 416), otherwise traverses the test system before reaching the destination server. Also in this latter case the self-updating mechanism of the policies in the data base 416 increases the effectiveness of detection, since it reduces the cases of suspect traffic being deflected towards the test system.

In fact, the system handles as suspect traffic, to be deviated towards the test system 420 all those packets/commands that are not explicitly forbidden or explicitly allowed depending on the rules in the data bases 415 and 416.

These are typically attacks whose outcome cannot be foreseen other than at the local level. This is e.g. the case of:
  attacks that do not compromise true vulnerable points of the final machines or that the final servers are in a position to avoid being provided by suitable patches and that would most likely generate false alarms,
  attacks that are not known yet and that only real test carried out on the single machines may detect, or
  traffic fragments—at any level—that cannot be correctly reconstructed, thereby avoiding evasion and insertion problems as described before, other than operating at the local level on a specific machine.

It will be appreciated that the problem of fragmentation described in the foregoing by referring primary to level 3 and a TCP flow also exists at the application level. At this level, the elementary communication entity or unit is the single command and this may also be arranged in such a way to bring an attack. Typically, an application command is contained in a single packet but, if that were not be the case, the intrusion detection system must be in a position to reconstruct it in a correct way in order to detect possible attacks therein.

A very simple example of fragmentation at the application level is represented by a generic protocol of the text-type such as HTTP or SMTP. Usually, interaction with the web server or the mail server is performed by sending complete strings of commands in a single packet. This significantly increases the network efficiency. However, it is possible to use the several independent packets to send the same request. For instance, any time an attacker directly questions the web server or the mail server of an interactive tool (for instance TELNET) the request sent to the server is fragmented into several packets, each containing a single character, since this is the logic currently used by interactive applications. If the intrusion detection system is not in a position to reconstruct the whole conversation and performs pattern matching only at the level of a single packet, a manipulation of this kind would be enough to invalidate the detection mechanism.

For instance, the following HTTP request exploits a well known vulnerability of the phf program for accessing the password file in a Unix system:

GET /cgi-bin/phf?Qalias=x%0a/bin/cat%20/etc/passwd

If one uses an interactive tool for inserting such a request, 50 (fifty) separate packets are generated, each including a single character. The intrusion detection system may detect this attack only by completely reconstructing the data flow. In order to do so, however, the intrusion detection system must be capable of understanding when a request is terminated. Additionally, it is necessary to keep track of the on-going sections and using time outs to avoid exhaustion of the resources requested to keep track of all the separate conversations. Furthermore, each time traffic flows are to be reconstructed, the intrusion detection system is exposed to the problems of evasion and insertion where described in the foregoing.

A traditional intrusion detection system is not capable to cope with this problem in an effective way.

Conversely, the arrangement described herein has the advantage that the traffic is not reconstructed by the sensor while this reconstruction action is performed by the test system 420. In fact, all traffic that is not explicitly forbidden, or explicitly allowed by the policies in the data bases 415 and 416 is handled as a suspect and deflected towards the test system 420.

Consequently, if the command reported in the foregoing is fragmented into 50 packets, the first packet, including the single character G, cannot be resolved correctly and is re-directed to the test system 420.

The single packet does not contain any unlawful payload, nor can compromise the test machine 421. Consequently, the detection system 422 re-directs it to the final system without risk. Similarly, each single packet included in the whole command is re-directed by the in-line component 410 towards the test machines 421; the detection system 422 checks the nature of the single packets and re-directs them to the final systems.

When the detection system 422 detects the dangerous nature of the command that is being formed, it stops immediately the flow thereof. This may occur, for instance, upon the appearance of the string cgi-bin/phf included in a given signature.

Consequently the system preserves its effectiveness also in the case where the "unknown" nature of the attack lies in such an attack being delivered in an attempt of evasion/insertion e.g. by fragmenting it in a plurality of packets/entities that—per se—are "innocent". As shown in the example considered, the dangerous nature of the command is in any case discovered when the last packet (the 51st) is sent including the ENTER character, starting execution of the entire command.

At that point, the intrusion detection system 422 of the test ambience detects the anomalous behavior of the system 421 that tries to access the password file, detects such a behavior as unlawful one and therefore blocks transmission of the 51st packet towards the final systems. In that way, execution of the command is prevented and the attack rendered moot.

Additionally, an alarm can be issued to provide evidence of the danger avoided and updating the data base 415 to permit the in-line component 416 to detect the future command (if sent in a single packet) and automatically blocking transmission thereof.

In that way, the dangerous command is not executed on the final systems in the internal network 130, and communication with the dangerous user is interrupted by means of traditional methods for "killing" the session while the interrupted current session is annihilated by application timeouts.

The re-transmission mechanism described leads to the test machines 421 never really providing any response to the users requests, since no communication exists between the test ambience 420 towards the outer network 110. This practically means that the test machines 421 in the test ambience 420 are inhibited from providing responses to the traffic: in fact, communication with the users is always closed only by the servers in the internal network.

Also, the arrangement described herein is adapted to operate also on communication entities taken from traffic away from the set of machines comprising the internal network 130 in order to possibly direct any unknown entity towards the test ambience 420.

These provisions lead to further improved security against those attacks possibly relying on any sort of information coming from the internal network 130 and/or the possibility of intercepting responses from the servers in the network 130 in order to maintain synchronization at the TCP level.

Those of skill in the art will promptly appreciate that it is not necessary for the test machines 420 to be a full, complete copy of the machines (servers) in the internal network 130. Essentially, the test machines 420 reproduce the software configuration of the servers in the internal network insofar as e.g. the operating systems, the software releases used, the services offered are concerned. This permits intrusions to be properly detected.

However, it is not necessary for the test machines 420 to fully reproduce the servers in the internal network 130 insofar as the application contents are concerned.

The mechanism just described is particularly suitable to be applied when the internal network 130 is comprised of machines offering homogenous services. This facilitates setting-up the test ambience 420 and makes detection quite effective from the very beginning.

Such a situation is a current one in the so-called server farms of large internet service providers or in the data processing departments of large companies. There, in order to permit easier and more effective management, both in terms of software updating and in terms of management overall, the tendency exists of grouping in common areas those machines offering homogenous services or exhibiting similar software configurations.

By implementing the re-transmission mechanism described at the level of the single packet, one also completely resolves the problem of a fragmentation both at level 3, as well as at the application level as described in the previous example.

In order to be totally safe in respect of problems related to fragmentations at the TCP flow level, all the sessions are preferably traced, by deviating towards the test system any TCP packets, namely those directed towards the internal network 130 and coming from the interface 411a and the corresponding responses provided by the servers in the network 130, transiting over the interface 411b. In that way, the test ambience 420 can keep track of all the sessions active on the final systems thus being perfectly updated concerning system status.

Those attacks exploiting evasion and insertion situations at TCP levels are very difficult to implement. Consequently, the test ambience 420 may not be required to include resources at a very high level as required to detect such quite unlikely attacks. Consequently, a judicious balance may be struck by adjusting the deviation mechanism of the traffic towards the test ambience in such a way to avoid such a rather costly and expectedly unnecessary intervention.

Of course, without prejudice to the underlying principles of the invention, the details and the embodiments may vary, also appreciably, with reference to what has been described by way of example only, without departing from the scope of the invention as defined by the annexed claims.

The invention claimed is:

1. A method of preventing intrusion in communication traffic directed toward a set of machines in a network from an external network, said traffic comprising communication entities, the method comprising the steps of:
providing a test system comprising test facilities replicating at least one of said machines in said set, wherein configurations and services of said machines are replicated within said test system to detect possibly adverse effects caused by any potentially dangerous communication entity before said potentially dangerous communication entity reaches said machines, said test system being inhibited from communicating with said external network;
receiving said communication entities and detecting attacks caused by said communication entities;
blocking said communication entities in response to detection of attacks, or determining whether said communication entities are unlawful or suspicious in response to detection of no attacks;
in response to determining that said communication entities are unlawful or suspicious, directing said communication entities in said traffic toward said test system;
running said communication entities directed toward said test system on said test facilities to detect the possibly adverse effects on said test system using the replicated configurations and services running on the test system; and
i) in the presence of an adverse effect, blocking the communication entities leading to said adverse effect, and
ii) in the absence of an adverse effect, directing the communication entities not having the adverse effect to said set of machines.

2. The method of claim 1, wherein said communication entities directed toward said test system include communication entities from traffic bound toward said set of machines.

3. The method of claim 1, wherein said communication entities directed toward said test system include communication entities from traffic coming from said set of machines.

4. The method of claim 1, comprising the steps of:
providing a data base comprising patterns representative of forbidden communication entities for communication with said set of machines; and
blocking forbidden communication entities in said traffic as identified by respective patterns included in said data base.

5. The method of claim 4, comprising the steps of:
detecting unknown communication entities in said traffic as identified by respective unknown patterns not included in said data base; and
directing said unknown communication entities in said traffic as identified by respective unknown patterns not included in said data base toward said test system to be run on said test facilities to detect possibly adverse effects on said test system.

6. The method of claim 5, comprising, in the presence of said adverse effect, the step of adding to said data base the respective pattern identifying the communication entity leading to said adverse effect.

7. The method of claim 6, comprising the steps of:
providing a parallel intrusion preventing arrangement including a respective data base including patterns representative of respective forbidden communication entities for communication with a respective set of machines; and
in the presence of said adverse effect, transmitting to said parallel intrusion preventing arrangement, for inclusion in said respective data base, the respective pattern identifying the communication entity leading to said adverse effect.

8. The method of claim 1, comprising the steps of:
providing a further data base comprising patterns representative of allowed communication entities for communication with said set of machines; and
allowing communication of allowed communication entities in said traffic as identified by respective patterns included in said further data base.

9. The method of claim 8, comprising the steps of:
detecting unknown communication entities in said traffic as identified by respective unknown patterns not included in said further data base; and
directing said unknown communication entities in said traffic as identified by respective unknown patterns not included in said further data base toward said test system to be run on said test facilities to detect possibly adverse effects on said test system.

10. The method of claim 9, comprising, in the absence of said adverse effect, the step of adding to said further data base the respective pattern identifying the communication entity failing to lead to said adverse effect.

11. The method of claim 10, comprising the steps of:
providing a parallel intrusion preventing arrangement including a respective further data base including patterns representative of respective allowed communication entities for communication with a respective set of machines; and
in the absence of said adverse effect, transmitting to said parallel intrusion preventing arrangement, for inclusion in said respective further data base, the respective pattern identifying the communication entity failing to lead to said adverse effect.

12. The method of claim 1, comprising, in the presence of said adverse effect, the step of subjecting to a resetting step those of said test facilities in said test system affected by said adverse effect.

13. The method of claim 1, wherein the machines in said set comprise facilities exposed to said adverse effect as well as additional contents, comprising the step of configuring said test facilities in order to replicate said facilities exposed to said adverse effect in the machines in said set.

14. The method of claim 1, comprising the steps of:
providing an in-line component ensuring said traffic with said set of machines; and
providing at least one interface interfacing said in-line component with said test system.

15. The method of claim 14, comprising the step of providing feedback from said test system to said in-line component via said at least one interface.

16. The method of claim 14, comprising the steps of:
providing a management network for managing said test system; and
providing feedback from said test system to said in-line component via said management network.

17. A system of preventing intrusion in communication traffic directed toward a set of machines in a network from an external network, said traffic comprising communication entities, said system comprising:
- a test system comprising test facilities replicating at least one of said machines in said set, said test facilities comprising at least one server that comprises at least one hardware component, wherein configurations and services of said machines are replicated within said test system to detect possibly adverse effects caused by any potentially dangerous communication entity before said potentially dangerous communication entity reaches said machines, and said test system being inhibited from communicate with said external network;
- an in-line network intrusion detection device for:
  - receiving said communication entities;
  - detecting attacks caused by said communication entities; and
  - blocking said communication entities in response to detection of attacks, or determining whether said communication entities are unlawful or suspicious in response to detection of no attacks,
- wherein said in-line network intrusion detection device comprises
- a first network interface for directing said communication entities in said traffic toward said test system in response to determining that said communication entities are unlawful or suspicious, wherein said communication entities directed toward said test system are adapted to be run on said test facilities to detect possibly adverse effects on said test system using the replicated configurations and services running on the test system,
- wherein said test system comprising said at least one hardware component is further configured for
  - i) in the presence of an adverse effect, blocking the communication entities leading to said adverse effect, and
  - ii) in the absence of an adverse effect, directing the communication entities not having the adverse effect to said set of machines.

18. The system of claim 17, wherein said communication entities directed toward said test system comprise communication entities from traffic bound toward said set of machines.

19. The system of claim 17, wherein said communication entities directed toward said test system comprise communication entities from traffic coming from said set of machines.

20. The system of claim 17, comprising:
- a data base comprising patterns representative of forbidden communication entities for communication with said set of machines; and
- a firewall device connected with a second network interface and configured for blocking forbidden communication entities in said traffic passing through from said second network interface as identified by respective patterns included in said data base.

21. The system of claim 20, wherein said in-line network intrusion detection device is configured for:
- detecting unknown communication entities in said traffic as identified by respective unknown patterns not included in said data base; and
- directing said unknown communication entities in said traffic as identified by respective unknown patterns not included in said data base toward said test system to be run on said test facilities to detect possibly adverse effects on said test system.

22. The system of claim 21, wherein, in response to the presence of said adverse effect, said in-line network intrusion detection device is further configured for adding the respective pattern identifying the communication entity leading to said adverse effect to said data base.

23. The system of claim 22, comprising an associated parallel intrusion preventing arrangement comprising a respective data base including patterns representative of respective forbidden communication entities for communication with a respective set of machines, said in-line network intrusion detection device transmits, in the presence of said adverse effect, to said parallel intrusion preventing arrangement, for inclusion in said respective data base, the respective pattern identifying the communication entity leading to said adverse effect.

24. The system of claim 17, comprising:
- a further data base comprising patterns representative of allowed communication entities for communication with said set of machines,
- wherein said in-line network intrusion detection device allows said allowed communication entities in said traffic as identified by respective patterns to communicate with said set of machines.

25. The system of claim 24, wherein said in-line network intrusion detection device is configured for:
- detecting unknown communication entities in said traffic as identified by respective unknown patterns not included in said further data base; and
- directing said unknown communication entities in said traffic as identified by respective unknown patterns not included in said further data base toward said test system to be run on said test facilities to detect possibly adverse effects on said test system.

26. The system of claim 25, wherein, in response to the absence of said adverse effect, said in-line network intrusion detection device is further configured for adding the respective pattern identifying the communication entity failing to lead to said adverse effect to said further data base.

27. The system of claim 25, comprising an associated parallel intrusion preventing arrangement comprising a respective further data base comprising patterns representative of respective allowed communication entities for communication with a respective set of machines, said in-line network intrusion detection device transmits, in the absence of said adverse effect, said parallel intrusion preventing arrangement, for inclusion in said respective further data base, the respective pattern identifying the communication entity failing to lead to said adverse effect.

28. The system of claim 17, wherein said test facilities in said test system are configured to undergo resetting following said adverse effect.

29. The system of claim 17, wherein the machines in said set comprise facilities exposed to said adverse effect as well as additional contents, while said test facilities replicate said facilities exposed to said adverse effect in the machines in said set.

30. The system of claim 17,
- wherein said in-line network intrusion detection device is configured for ensuring said traffic with said set of machines, and
- said system further comprises at least one interface interfacing said in-line network intrusion detection device with said test system.

31. The system of claim 30, wherein said test system comprising at least one hardware component is configured for providing feedback to said in-line network intrusion detection device via said at least one interface.

32. The system of claim 30, comprising a management network for managing said test system and said test system comprising at least one hardware component is configured for providing feedback to said in-line network intrusion detection device via said management network.

33. A telecommunication network comprising the system of any one of claims 17 to 29 or 30 to 27.

34. A non-transitory computer readable storage medium encoded with a program product loadable into a memory of at least one computer and including software portions, which when executed by the at least one computer, cause the at least one computer to perform the steps of the method of any one of claims 1 to 13 or 11 to 14 when said program is run on the at least one computer.

* * * * *

UNITED STATES PATENT AND TRADEMARK OFFICE
CERTIFICATE OF CORRECTION

| | | |
|---|---|---|
| PATENT NO. | : 8,356,349 B2 | Page 1 of 1 |
| APPLICATION NO. | : 10/576250 | |
| DATED | : January 15, 2013 | |
| INVENTOR(S) | : Brusotti et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1259 days.

Signed and Sealed this
Eleventh Day of November, 2014

Michelle K. Lee
*Deputy Director of the United States Patent and Trademark Office*